F. C. DE GUIRE.
WINDMILL.
APPLICATION FILED JULY 16, 1909.
953,195.
Patented Mar. 29, 1910.
3 SHEETS—SHEET 3.
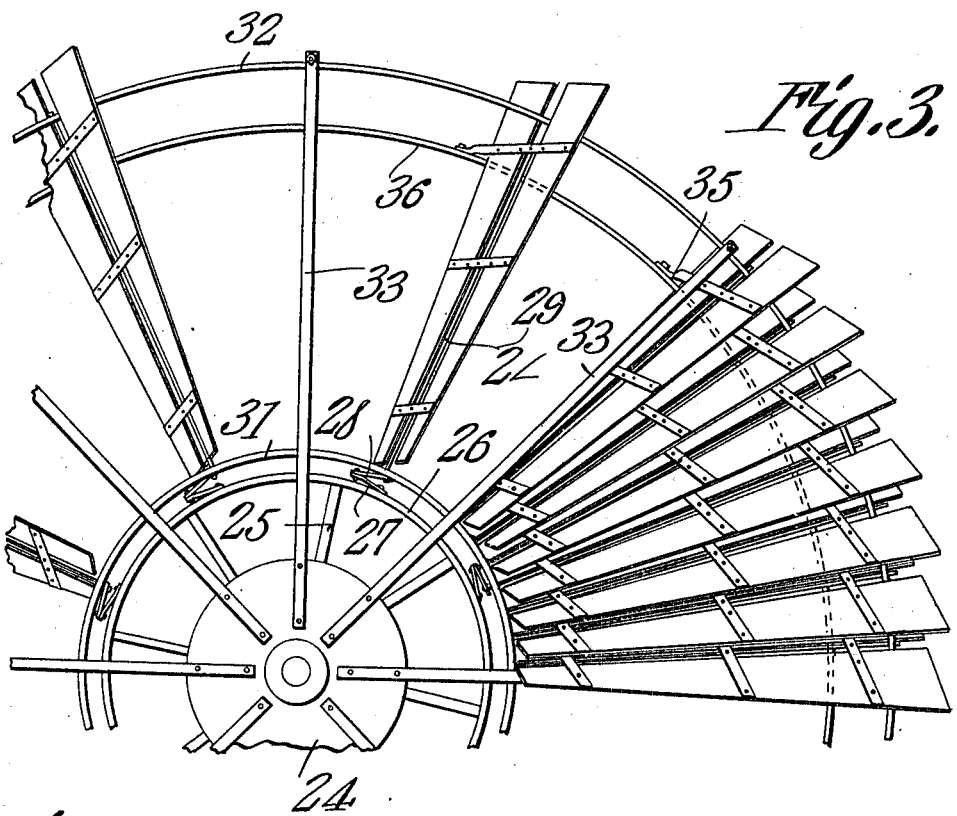
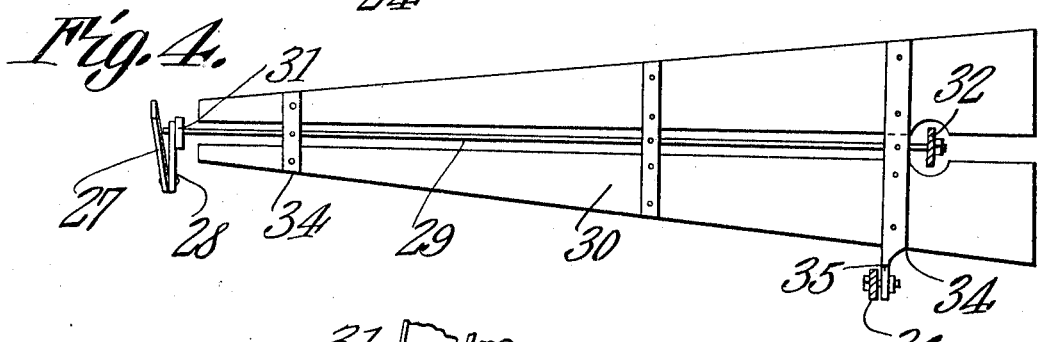
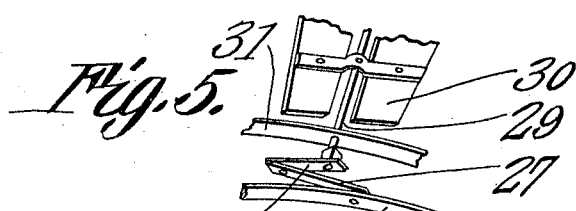
Inventor
Frank C. De Guire.
Witnesses
By C. A. Snow & Co.
Attorneys

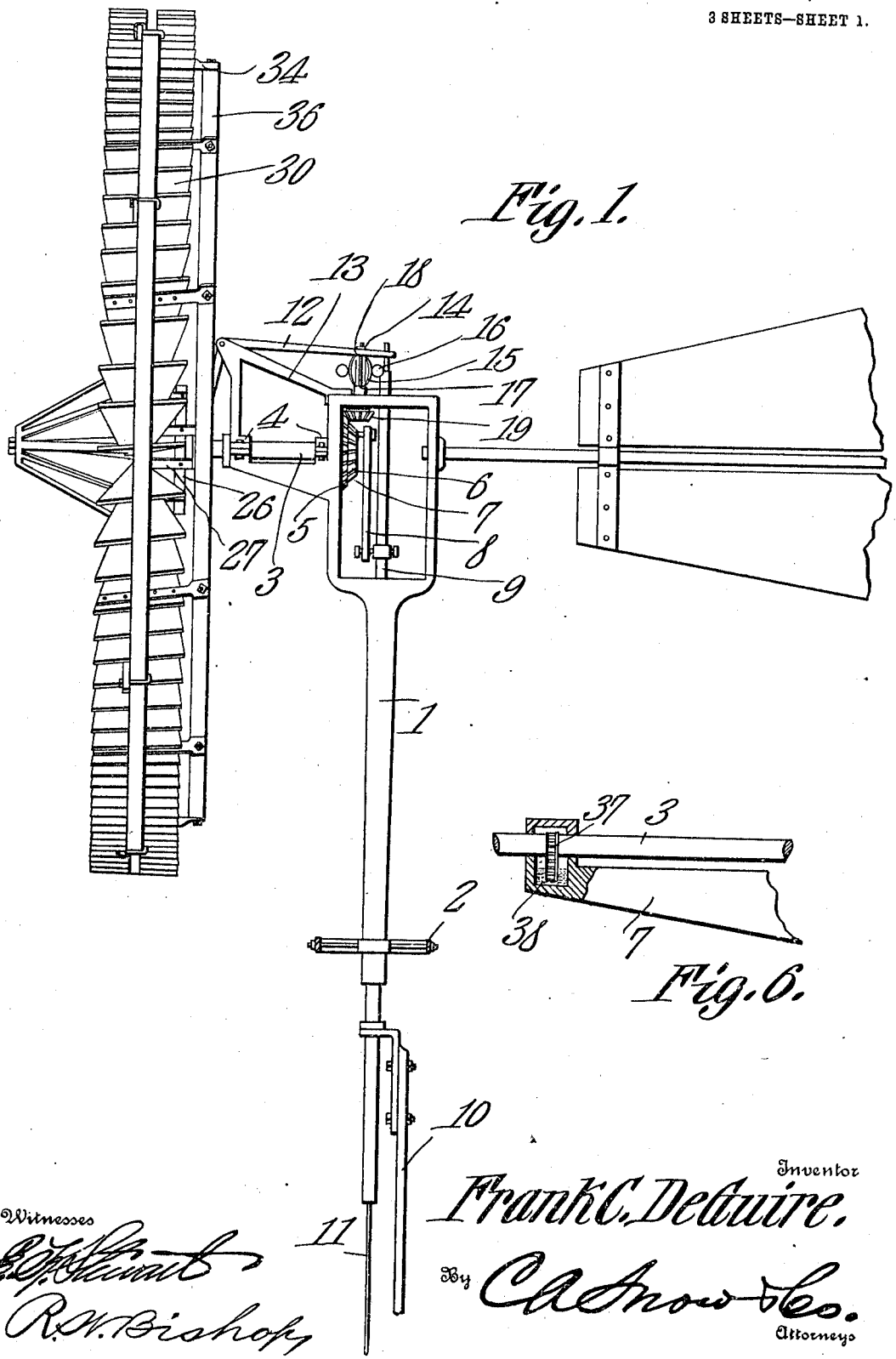

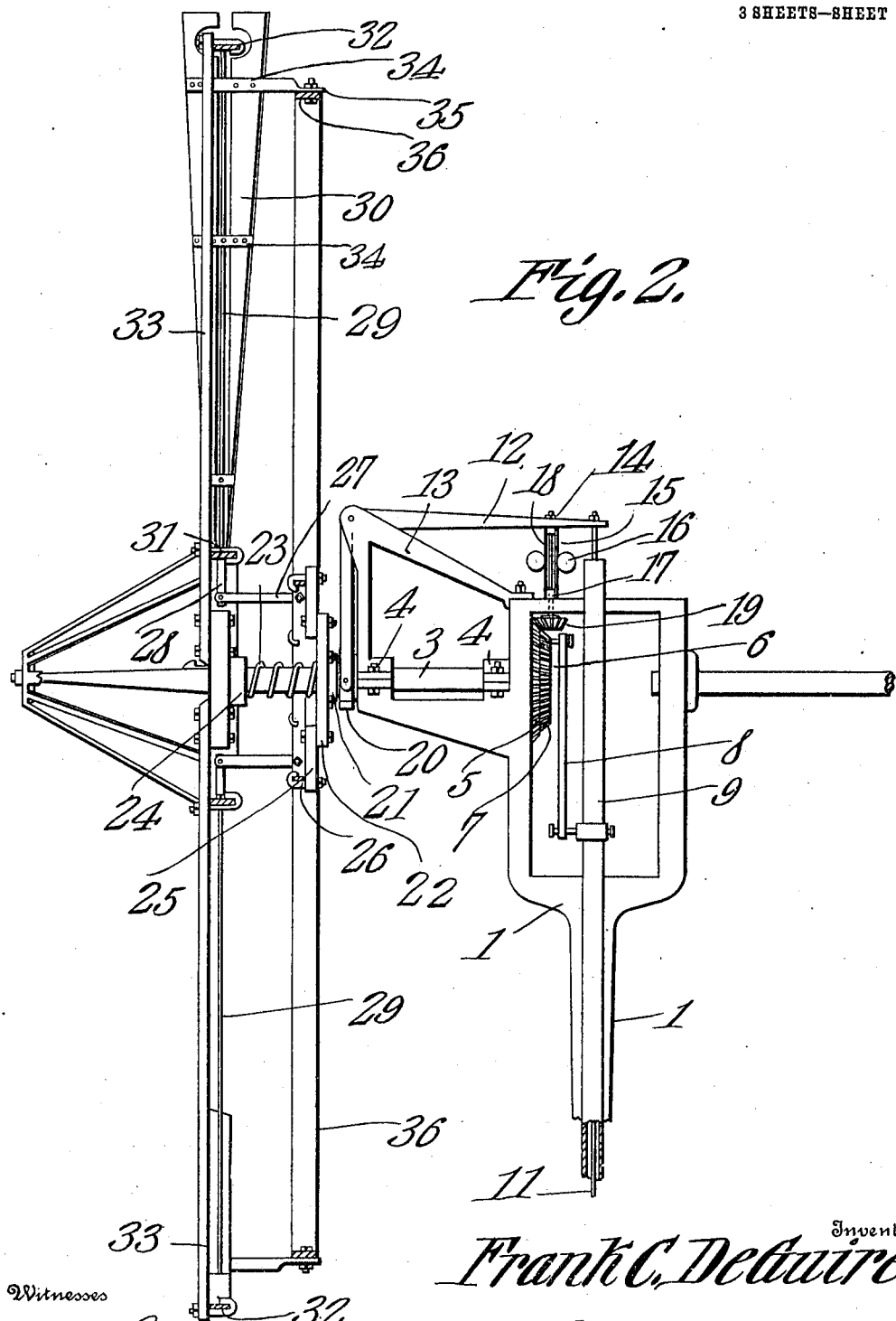

UNITED STATES PATENT OFFICE.

FRANK C. DE GUIRE, OF HEREFORD, TEXAS.

WINDMILL.

953,195.      Specification of Letters Patent.      Patented Mar. 29, 1910.

Application filed July 16, 1909. Serial No. 507,990.

*To all whom it may concern:*

Be it known that I, FRANK C. DE GUIRE, a citizen of the United States, residing at Hereford, in the county of Deaf Smith and State of Texas, have invented a new and useful Windmill, of which the following is a specification.

This invention relates to improvements in windmills, and has for its object the provision of means whereby the speed of the mill may be kept at a uniform rate, notwithstanding variations in the force of the wind.

The invention is fully illustrated in the accompanying drawings and consists in certain novel features of the same which will be hereinafter first fully described and then pointed out in the claim.

In the drawings, Figure 1 is a side elevation of a windmill embodying my invention. Fig. 2 is a sectional elevation on a larger scale of the upper portion of the windmill. Fig. 3 is a front elevation of a part of the windmill. Fig. 4 is a detail view of one of the blades or vanes of the wheel, and Fig. 5 is a detail view of the connections between the blade or vane and the slidable governing ring. Fig. 6 is a detail view of one of the bearings of the driving shaft.

The windmill head 1 may be of the usual or any preferred construction, and is attached to the windmill tower (not shown) by the usual swivel and connecting bolts 2 so as to move freely on the tower to present the wheel to the wind. The driving shaft 3 is mounted in suitable bearings 4 on the windmill head 1 and carries at its inner end a gear wheel 5 and a crank disk 6 which may be provided with gear teeth 7 on its edge so that, when so desired, the driving shaft may be coupled by means of beveled gearing to a rotary shaft to operate machinery.

In the drawings, I have shown the usual pitman 8 connecting the crank disk 6 with a pump rod 9, and it will be understood that the said pump rod 9 may be given any desired stroke by shifting the pivot pin connecting the pitman to the crank disk radially of the said disk. The pump rod 9 is, as usual, constructed of an upper hollow portion, and a lower portion 10 secured to and carried by the upper hollow portion and connected directly to the usual pump mechanism. Through the hollow portion of the pump rod a controlling rod 11 passes upward to a lever 12 so that by pulling downward on the said controlling rod 11, the said lever 12 may be manipulated to throw the wheel out of action.

In carrying out the present invention, the lever 12 is in the form of an angle lever fulcrumed at its bend or turned portion upon a bracket or arm 13 projecting from the upper side of the windmill head, and the upper horizontal arm of the said lever is connected to a sleeve 14 at the upper end of a pair of spring arms 15 provided with weights or balls 16 at their centers and having their lower ends secured to a fixed collar or other support 17 on the upper side of the windmill head. A spindle 18 passes through the ring or bearing 17 and through the upper portion of the windmill head, and has a beveled pinion 19 on its lower end which meshes with the beveled gear wheel 5, as clearly shown. The outer vertical arm of the lever 12 has its lower end pivotally attached to a collar 20 fitting around the grooved sleeve 21 slidably mounted on the driving shaft 3 and having a disk or circular plate 22 rigidly secured to its outer end, a spring 23 being coiled around the driving shaft between the said disk or plate 22 and the hub 24 of the wind wheel so as to hold the said disk or plate normally toward the windmill head. The plate or disk 22 carries a series of radial arms 25 to the outer ends of which is secured a ring or band 26 to which are pivotally attached a series of links 27 having their outer ends pivotally secured to cranks 28 secured to the lower ends of turning rods 29 to which blades or vanes 30 are secured, the said rods being journaled in annular concentric bands or rings 31 and 32 which constitute the main frame of the wind wheel, the said bands or rings being secured to and carried by spokes 33 radiating from the hub 24.

The blades or vanes are composed of two members, as clearly shown in Fig. 4, connected by braces 34 passing across and secured to the rods 29, and the uppermost of the said braces 34 have their inner ends extended, as shown at 35, and secured to a connecting ring 36.

By referring to Fig. 3, it will be seen that the blades or vanes are arranged in groups around the wind wheel, and a crank 28 is provided for each group so that the movement of the crank will be transmitted positively and directly to the central blade of each group and indirectly to the other blades of the group through the connecting ring 36 thus obtaining simultaneous and equal movement of all the blades without unnecessary multiplication of the parts, The preferred method of lubricating the driving shaft is shown in Fig. 6. A well 38 is formed in the upper side of the horizontal arm of the well head which is filled with oil. A chain 37 is hung loosely on the shaft and depends therefrom into the well so that as the shaft revolves, the chain will be caused to move through the oil, some of which will be taken up thereby and applied to the shaft.

The operation of the device will, it is thought, be readily understood. The springs 15 and 23 are adjusted so as to permit the wheel to revolve at any desired predetermined speed. Should this speed be exceeded the governor balls or weights 16 will move outward under centrifugal force and thereby pull the sleeve 14 downward consequently vibrating the angle lever 12 so as to push the sleeve 21 and its attached disk 22 and ring 26 outward against the tension of the springs 23 thereby transmitting motion to the links 27 and the cranks 28 so as to rotate the turning rods 29 and thereby turn the blades 30 out of action. When the speed drops to the desired degree, the parts will automatically return to their former position, as will be readily understood.

It will be seen that my device is composed of very few parts which are compactly arranged so that it is not very liable to get out of order and it is very efficient for the purpose desired.

Having thus described my invention, what I claim is:

The combination of a wind mill head, a driving shaft journaled therein, a wind wheel carried by said shaft and having concentric rings, radially disposed rods journaled in said rings, blade members arranged at opposite sides of said rods, transverse braces secured rigidly to said rods and to said blade members, the outermost of said braces projecting beyond the inner edges of the blade members, a connecting ring pivotally attached to the inner ends of all of said projecting braces, crank arms at the lower ends of some of the radial rods, a governor head slidably mounted on the driving shaft, links connecting the governor head with said crank arms, a governor mounted on the wind mill head, an angle lever pivoted upon the wind mill head and having its vertical arm engaging the slidable governor head and its horizontal arm projecting inward over and connected to the governor, and gearing between the governor and the driving shaft.

In testimony that I claim the foregoing as my own, I have hereto affixed my signature in the presence of two witnesses.

FRANK C. DE GUIRE.

Witnesses:
CHARLES T. McGEE,
WALTER B. PARK.